(12) United States Patent
Aya et al.

(10) Patent No.: US 7,916,463 B2
(45) Date of Patent: Mar. 29, 2011

(54) INFORMATION PROCESSING APPARATUS

(75) Inventors: Sohei Aya, Fussa (JP); Hideyuki Toma, Kodaira (JP); Teruo Kinoshita, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 71 days.

(21) Appl. No.: 12/499,729

(22) Filed: Jul. 8, 2009

(65) Prior Publication Data

US 2010/0067186 A1 Mar. 18, 2010

(30) Foreign Application Priority Data

Sep. 12, 2008 (JP) ................................. 2008-235646

(51) Int. Cl.
*G06F 1/16* (2006.01)

(52) U.S. Cl. .................................. 361/679.28; 343/702

(58) Field of Classification Search .............. 361/679.28
See application file for complete search history.

(56) References Cited

U.S. PATENT DOCUMENTS

| | | | |
|---|---|---|---|
| 6,388,627 B1 * | 5/2002 | Masaki et al. ................. | 343/702 |
| 6,456,499 B1 * | 9/2002 | Nakajima et al. ............. | 361/752 |
| 6,509,877 B2 * | 1/2003 | Masaki ......................... | 343/702 |
| 6,625,013 B2 * | 9/2003 | Minaguchi et al. ........ | 361/679.55 |
| 6,751,476 B2 * | 6/2004 | Masaki et al. ................ | 455/558 |
| 7,009,568 B2 * | 3/2006 | Amemiya et al. ............ | 343/702 |
| 7,043,209 B2 * | 5/2006 | Hirota .......................... | 455/101 |
| 7,123,196 B2 * | 10/2006 | Masaki ......................... | 343/702 |
| 7,142,886 B2 * | 11/2006 | Murayama et al. ........ | 455/556.1 |
| 7,199,734 B1 | 4/2007 | Yasumasa | |
| 7,319,434 B2 * | 1/2008 | Hirota ........................... | 343/702 |
| 7,423,866 B2 * | 9/2008 | Miyamoto et al. ........ | 361/679.27 |
| 7,486,955 B2 * | 2/2009 | Fukushima ................. | 455/452.1 |
| 7,522,109 B2 * | 4/2009 | Shimasaki et al. ............ | 343/702 |
| 7,733,275 B2 * | 6/2010 | Hirota ........................... | 343/702 |
| 2001/0046116 A1 * | 11/2001 | Amemiya et al. ............ | 361/683 |
| 2002/0038400 A1 * | 3/2002 | Fukushima ................... | 710/300 |
| 2003/0007322 A1 * | 1/2003 | Amemiya et al. ............ | 361/683 |
| 2003/0181227 A1 * | 9/2003 | Toshiyuki .................. | 455/575.1 |
| 2003/0198008 A1 | 10/2003 | Leapman et al. | |

(Continued)

FOREIGN PATENT DOCUMENTS

JP 2002-215269 A 7/2002

(Continued)

OTHER PUBLICATIONS

Explanation of Non-English Language References, Jul. 2009.

*Primary Examiner* — Lisa Lea-Edmonds
(74) *Attorney, Agent, or Firm* — Knobbe, Martens Olson & Bear LLP (57) ABSTRACT

According to one embodiment, the information processing apparatus includes a main housing, a display housing containing a display panel, a hinge section provided between an end part of the main housing and an end part of the display housing and rotatably coupling the display housing to the main housing, a first antenna section, and a second antenna section. The first antenna section is provided in the end part of the display housing and electrically connected to the display panel, and at least a part of the first antenna section is located below the display panel in a state where the display housing is in a raised position relative to the main housing. The second antenna section is provided in the main housing, and is configured to perform wireless communication with the first antenna section.

10 Claims, 7 Drawing Sheets

U.S. PATENT DOCUMENTS

| | | | |
|---|---|---|---|
| 2004/0070543 A1* | 4/2004 | Masaki | 343/702 |
| 2004/0264119 A1* | 12/2004 | Hirota | 361/683 |
| 2006/0139220 A1* | 6/2006 | Hirota et al. | 343/702 |
| 2006/0141968 A1* | 6/2006 | Masaki | 455/272 |
| 2006/0143310 A1* | 6/2006 | Fukushima | 709/250 |
| 2007/0053144 A1* | 3/2007 | Nakatani et al. | 361/680 |
| 2007/0057855 A1* | 3/2007 | Mizoguchi et al. | 343/702 |
| 2009/0033569 A1* | 2/2009 | Motoe et al. | 343/702 |
| 2009/0048004 A1* | 2/2009 | Fukushima | 455/574 |

FOREIGN PATENT DOCUMENTS

| | | |
|---|---|---|
| JP | 2003-345463 A | 12/2003 |
| JP | 2007-006176 A | 1/2007 |
| JP | 2007-149049 A | 6/2007 |

* cited by examiner

INFORMATION PROCESSING APPARATUS

CROSS-REFERENCE TO RELATED APPLICATIONS

This application is based upon and claims the benefit of priority from Japanese Patent Application No. 2008-235646, filed Sep. 12, 2008, the entire contents of which are incorporated herein by reference.

BACKGROUND

1. Field

One embodiment of the invention relates to an information processing apparatus configured to perform wireless communication.

2. Description of the Related Art

An information processing apparatus, such as a potable computer, comprising a main housing, a display housing, and a hinge section which rotatably couples the display housing to the main housing. A cable configured to supply a display panel with image data extends from within the main housing through the hinge section to the display housing.

Jpn. Pat. Appln. KOKAI Publication No. 2003-345463 discloses a computer containing a transceiver set. The computer comprising a computer base unit and a detachable display device which is detachably attached to the computer base unit. The detachable display device comprising an operation system and a processor, and functions as a tablet PC. Each of the computer base unit and the detachable display device comprising a transceiver, and is configured to perform wireless communication therebetween.

Recently, there has been a demand for further minimizing and sliming an information processing apparatus. However, in a recent information processing apparatus, a large number of cables extend from within a main housing through a hinge section into a display housing. Therefore, the flexibility in the configuration of the hinge section has been limited, and it has become difficult to ensure the strength of the hinge section.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus comprises a main housing, a display housing containing a display panel, a hinge section provided between an end part of the main housing and an end part of the display housing and rotatably coupling the display housing to the main housing, a first antenna section, and a second antenna section. The first antenna section is provided in the end part of the display housing and electrically connected to the display panel. At least a part of the first antenna section is located below the display panel in a state where the display housing is in a raised position relative to the main housing. The second antenna section is provided in the main housing and configured to perform wireless communication with the first antenna section.

Hereinafter, embodiments of the present invention will be described based on the drawings applied to a portable computer.

First Embodiment

Figure 1:
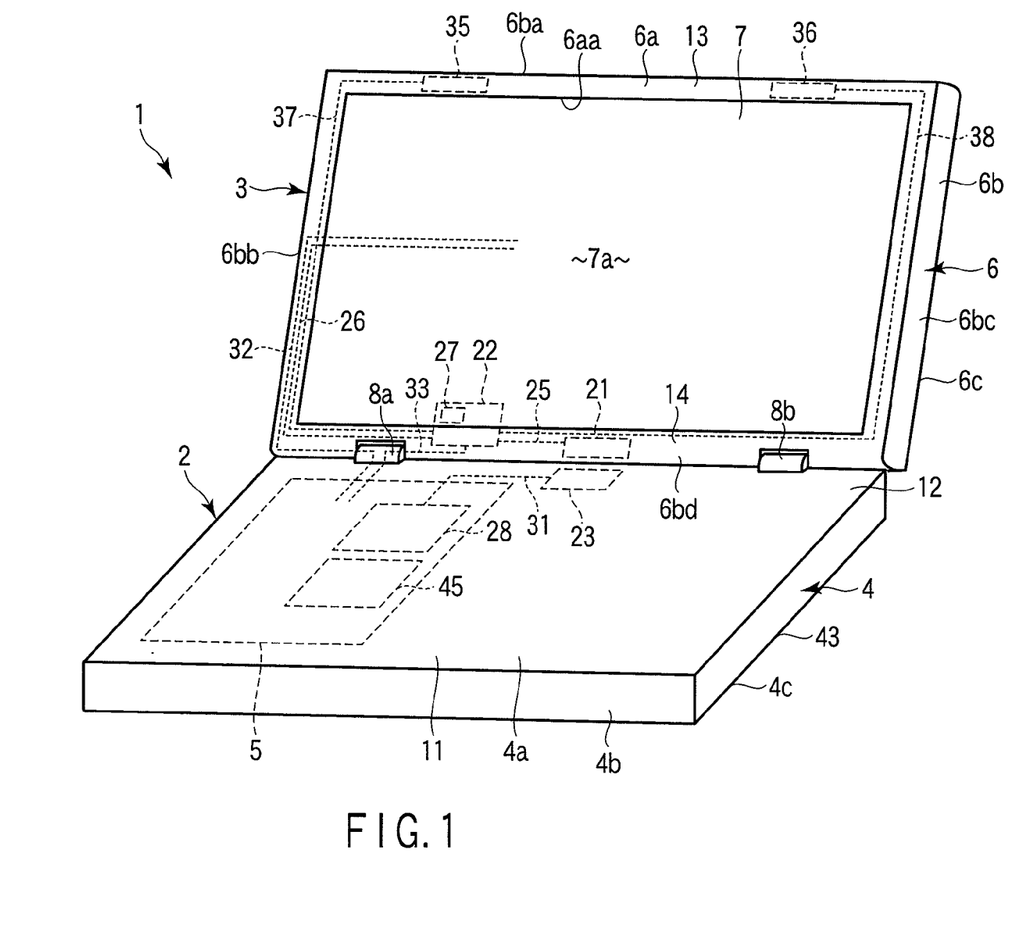
FIG. 1 is an exemplary perspective view of a portable computer according to a first embodiment of the present invention.

FIGS. 1-6 disclose a portable computer 1 as an information processing apparatus according to a first embodiment of the present invention. As shown in FIG. 1, the portable computer 1 comprising a main unit 2, which is an apparatus main body, and a display unit 3.

The main unit 2 comprising a main housing 4. The main housing 4 comprising an upper wall 4a, a peripheral wall 4b, and a lower wall 4c, and is formed in the shape of a flat box. On the upper wall 4a, a keyboard (not shown), for example, is mounted. The main housing 4 contains a main board 5. The main unit 2 is used, for example, on a desk.

As shown in FIG. 1, the display unit 3 comprising a display housing 6. The display housing 6 comprising a front wall 6a, a peripheral wall 6b, and a back wall 6c, and is formed in the shape of a flat box. The display housing 6 contains a display panel 7. Examples of the display panel 7 are a liquid crystal display (LCD) and an organic electroluminescent (EL) display. However, the type of the display panel 7 is not particularly limited. The display panel 7 comprising a display screen 7a configured to display an image. The front wall 6a of the display housing 6 comprising an opening part 6aa that exposes the display screen 7a of the display panel 7 to the outside of the display housing 6.

As shown in FIG. 1, for example, a pair of hinge sections 8a, 8b is provided between the main housing 4 and the display housing 6. The display housing 6 is supported by the main housing 4 via the hinge sections 8a, 8b. The pair of hinge sections 8a, 8b are spaced from each other in a longitudinal direction of the main housing 4. It is not always necessary to provide a plurality of hinge sections, and one hinge section may be provided.

As shown in FIG. 1, the main housing 4 comprising a front end part 11 and a rear end part 12. The front end part 11 is an end part on the user side in the main housing 4. For example, the front end part 11 is located closer to the user than the keyboard. The rear end part 12 is an end part opposite to the front end part 11 in the main housing 4. Namely, the rear end part 12 is an end part on the opposite side of the user in the main housing 4, and is located farther from the user than the keyboard.

The display housing 6 comprising an upper end part 13 and a lower end part 14. The upper end part 13 is located above the display panel 7 when the display housing 6 is in the raised position relative to the main housing 4. The lower end part 14 is an end part opposite to the upper end part 13 in the main housing 4. The lower end part 14 is located below the display panel 7 when the display housing 6 is in the raised position. Namely, when the display housing 6 is in the raised position, the lower end part 14 is on the main housing side of the display panel 7.

The hinge sections 8a, 8b are provided between the rear end part 12, which is an end part of the main housing 4, and the lower end part 14, which is an end part of the display housing 6. The hinge sections 8a, 8b rotatably couple the display housing 6 to the main housing 4. Therefore, the display housing 6 is rotatable (openable and closable) between a first position (refer to FIG. 3) in which the display housing 6 is laid to cover the upper wall 4a from above and a second position (refer to FIG. 2) in which the display housing 6 is raised relative to the main housing 4 to expose the upper wall 4a of the main housing 4 and the display screen 7a.

The "raised position" of the present invention is not limited to the position in which the display housing 6 is positioned vertically. The "raised position" of the present invention refers to a wide range of positions in which the display screen 7a of the display housing 6 is exposed to a user, and including a position in which the display housing 6 is inclined relative to the vertical axis.

As shown in FIG. 1, a first antenna section 21 and a first wireless module section 22 are provided in the display housing 6. The first antenna section 21 performs wireless communication with a second antenna section 23 described later. The first antenna section 21 is located in the lower end part 14 of the display housing 6 coupled to the hinge sections 8a, 8b.

When the display housing is in the raised position, at least a part of the first antenna section 21 is located below the display panel 7 (i.e., on the main housing side). According to the present embodiment, the whole first antenna section 21 is below the display panel 7.

Figure 2:
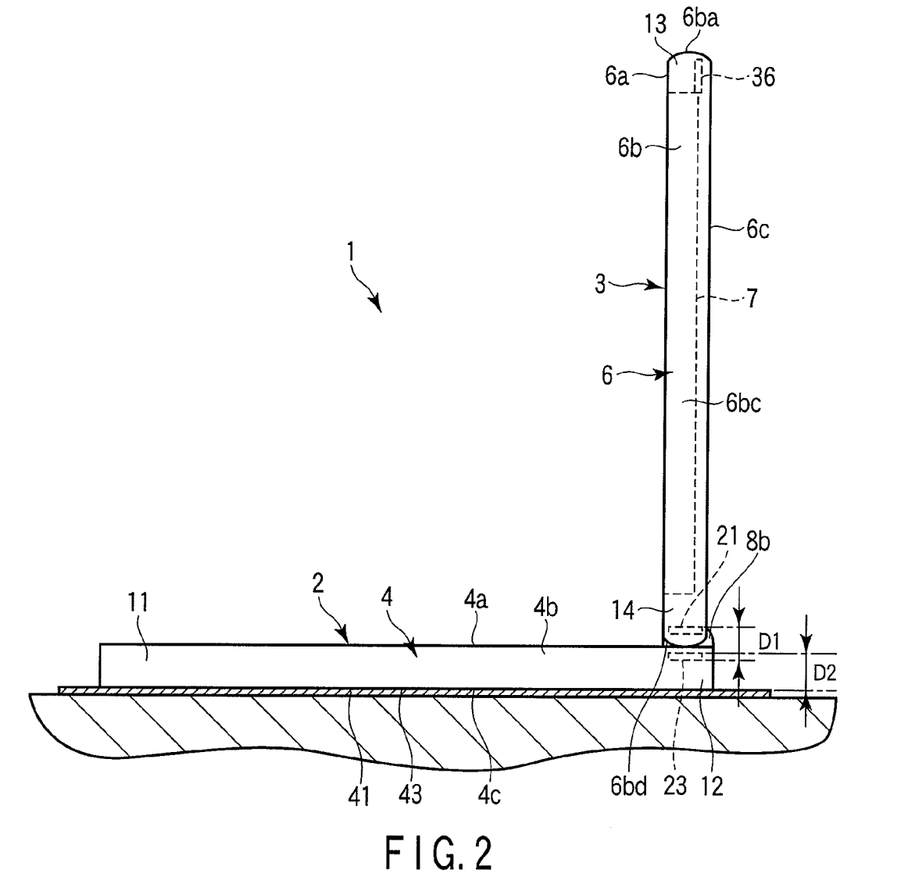
FIG. 2 is an exemplary side view of the portable computer shown in FIG. 1.

More specifically, as shown in FIGS. 1 and 2, the peripheral wall 6b of the display housing 6 comprising an upper wall part 6ba, left wall part 6bb, right wall part 6bc and a lower wall part 6bd. The upper wall part 6ba is horizontally provided above the display panel 7 in a state where the display housing 6 is in the raised position. The lower wall part 6bd is horizontally provided below the display panel 7 in the state where the display housing 6 is in the raised position. The left and right wall parts 6bd, 6bc extend between the upper wall part 6ba and the lower wall part 6bd. The first antenna section 21 is contained, for example, in a space between the display panel 7 and the lower wall part 6bd.

As shown in FIG. 1, a first wireless module section 22 is a circuit board contained in the display housing 6, for example. The first antenna section 21 is controlled by the first wireless module section 22. The first antenna section 21 is electrically connected to the first wireless module section 22 via a coaxial cable 25, for example. The first wireless module section 22 is electrically connected to the display panel 7 via, an image signal line 26, which is a coaxial cable, for example. Accordingly, the first antenna section 21 is electrically connected to the display panel 7 via the first wireless module section 22.

As shown in FIG. 1, a memory 27 is provided in the display housing 6. The memory 27 is mounted, for example, in the first wireless module section 22. The memory 27 stores image data on an image displayed on the display panel 7 when wireless connection between the first and second antenna sections 21, 23 is unavailable.

As shown in FIG. 1, a second antenna section 23, a second wireless module section 28 (communication module section) and a power source section 29 (refer to FIG. 4) are provided in the main housing 4. The second antenna section 23 is located in the rear end part 12 of the main housing 4 coupled to the hinge sections 8a, 8b.

The second antenna section 23 performs wireless communication with the first antenna section 21. The first and second antenna sections 21, 23 are antennas that perform, for example, proximity wireless communication. The proximity wireless communication refers to wireless communication whose communication distance (i.e., communication-possible distance) is several centimeters. The first and second antenna sections 21, 23 are antennas for, for example, TransferJet (trademark). The communication distance of first and second antenna sections 21, 23 is, for example, 3 cm.

As shown in FIG. 2, the lower end part 14 of the display housing 6 in the raised position is located above the rear end part 12 of the main housing 4. The second antenna section 23 is located below the lower end part 14 of the display housing 6. The first and second antenna sections 21, 23 are vertically aligned with each other when the display housing 6 is in the raised position.

Figure 3:
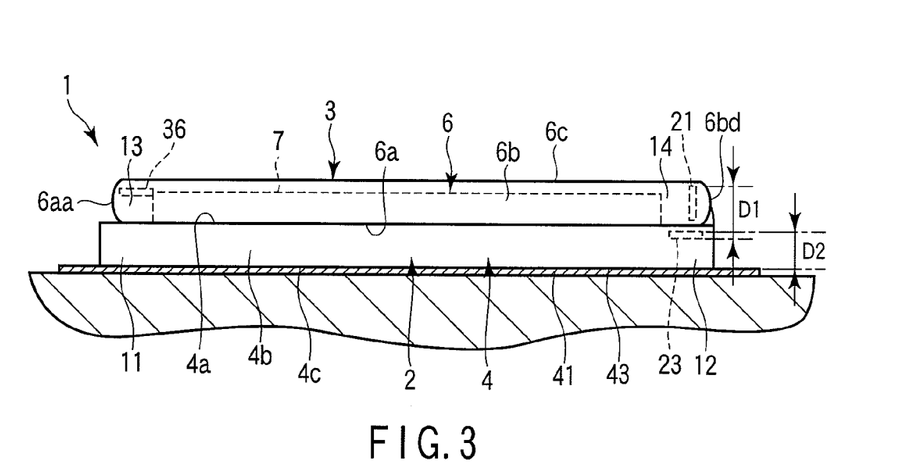
FIG. 3 is an exemplary side view of the portable computer shown in FIG. 1.

As shown in FIGS. 2 and 3, distance D1 between the first antenna section 21 and the second antenna section 23 is always within a communication distance (e.g., 3 cm) of the wireless communication regardless of a rotational position of the display housing 6 relative to the main housing 4.

The mounting positions and postures of the first and second antenna sections 21 and 23 are set so that the connection between the first and second antenna sections 21, 23 is in a better condition in the state where the display housing 6 is raised relative to the main housing 4 than in the state where the display housing 6 is in a laid position relative to the main housing 4.

For example, distance D1 between the first and second antenna sections 21, 23 is shorter in the state the display housing 6 is raised relative to the main housing 4 (FIG. 2) than in the state the display housing 6 is in the laid position relative to the main housing 4 (FIG. 3). For example, in the case where the first and second antenna sections 21, 23 are antennas of capacitor type, the postures thereof are set so that the two antenna sections 21, 23 are parallel to each other in the state where the display housing 6 is raised relative to the display housing 4.

As shown in FIG. 1, the second wireless module section 28 is provided, for example, in a main board 5. The second antenna section 23 is controlled by the second wireless module section 28. The second antenna section 23 is electrically connected to the second wireless module section 28 via a coaxial cable 31, for example. Therefore, the second antenna section 23 is electrically connected to the main board 5 via the second wireless module section 28.

Figure 4:
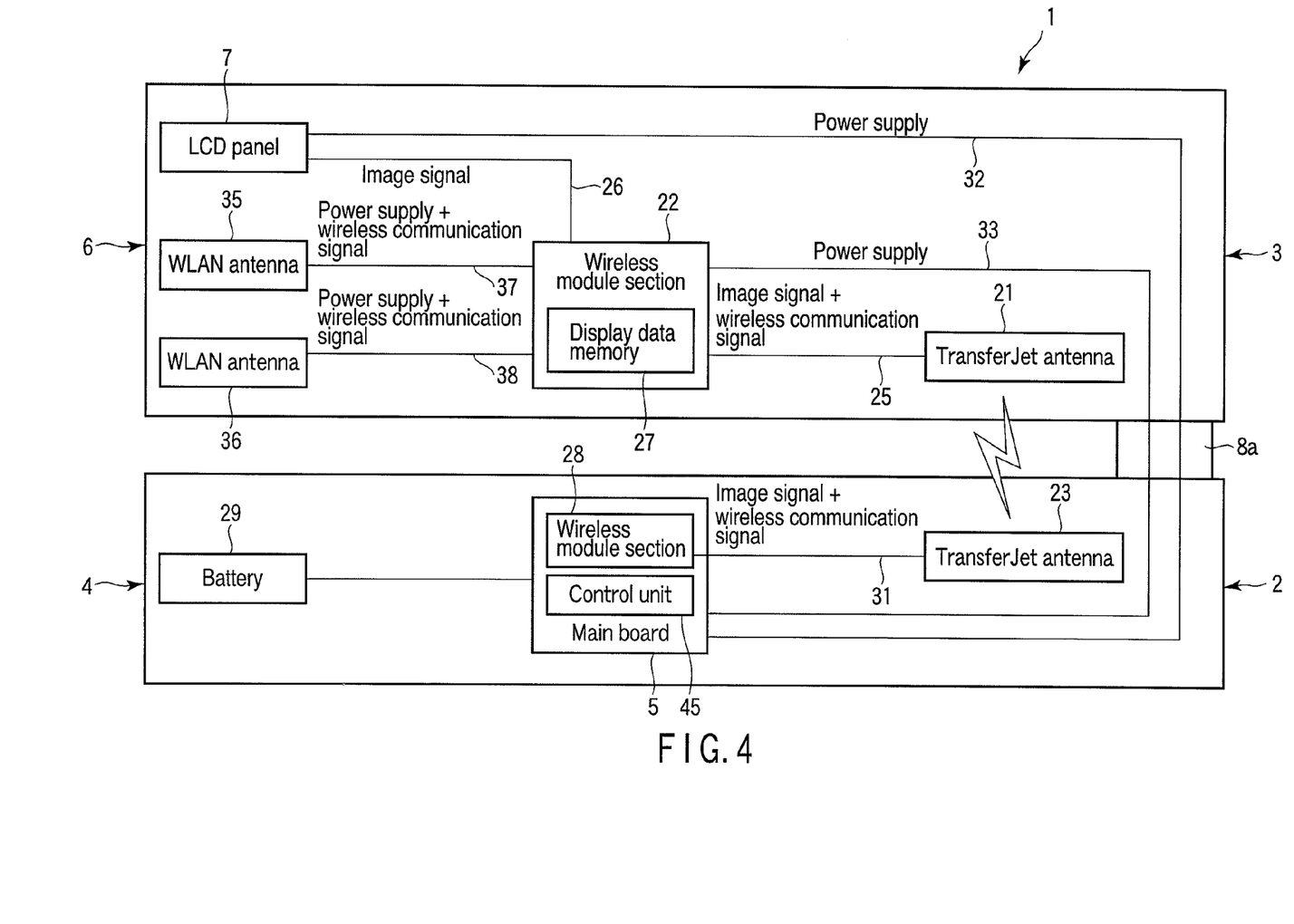
FIG. 4 is an exemplary schematic diagram of a system configuration of the portable computer shown in FIG. 1.

As shown in FIG. 1, the portable computer 1 comprising, for example, two power supply lines 32, 33. The two power supply lines 32, 33 are coaxial cables, for example. As shown in FIG. 4, the main board 5 is electrically connected to the power source section 29 (for example, battery), and is supplied with power by the power source section 29. The two power supply lines 32, 33 are both electrically connected to the main board 5, and supplied with power by the power source section 29 via the main board 5.

The power supply lines 32, 33 extend from within the main housing 4 via the hinge section 8a (i.e., through the hinge section 8a) into the display housing 6. One power supply line 32 is electrically connected to the display panel 7, and supplies power to the display panel 7. The other power supply line 33 is electrically connected to the first wireless module section 22, and supplies power to the first wireless module section 22.

As shown in FIGS. 1 and 2, the display unit 3 comprising, for example, a pair of third antenna sections 35, 36. The third antenna sections 35, 36 are provided, for example, in the display housing 6. The third antenna sections 35, 36 are arranged in the upper end part 13 of the display housing 6 opposite to the lower end part 14 coupled to the hinge sections 8a, 8b.

The third antenna sections 35, 36 are each arranged in such a manner that a part of the third antenna section 35, 36 is located above the display panel 7 in the state where the display housing 6 is in the raised position. In the present embodiment, the whole third antenna sections 35, 36 are located above the display panel 7. The third antenna sections 35, 36 are contained in a space between the display panel 7 and the upper wall part 6ba.

The number of third antenna sections is not particularly limited, and one third antenna section or more than two third antenna sections may be provided. Further, the third antenna section is not necessarily provided in the upper end part 13 of the display housing 6. The third antenna section may be provided, for example, in the left end part, right end part or lower end part 14 of the display housing 6.

Each of the third antenna sections 35, 36 is an antenna configured, for example, to perform wireless communication with an external apparatus. Each of the third antenna sections 35, 36 is an antenna configured, for example, to perform middle distance wireless communication or long distance wireless communication. An example of each of the third antenna sections 35, 36 is an antenna for a wireless LAN (WLAN). However, the third antenna sections 35, 36 are not limited to the above example, and may be an antenna of Bluetooth (trademark), or an antenna compatible with a communication system, such as a wireless WAN, WiMAX, UWB or GPS, a mobile telephone system, such as 3G or 3.5G, or another communication system of various types.

As shown in FIG. 1, the first wireless module section 22 provided in the display housing 6 is electrically connected to the third antenna sections 35, 36 via the coaxial cable 37, 38. Therefore, the first antenna section 21 is electrically connected to the third antenna sections 35, 36 via the first wireless module section 22.

Referring to FIG. 4, the flow of signals in the portable computer 1 will be described.

As shown in FIG. 4, the second wireless module section 28 of the main board 5 transmits an image signal to be displayed on the display panel 7 to the second antenna section 23, and communicate, with the second antenna section 23, a wireless communication signal used for wireless communication of the third antenna sections 35, 36.

The second antenna section 23 transmits the image signal to the first antenna section 21, and transmits the wireless communication signal to and receives the wireless communication signal from the first antenna section 21. The first antenna section 21 receives the image signal and the wireless communication signal from the second antenna section 23, and transmits the image signal and the wireless communication signal to the first wireless module section 22.

The first wireless module section 22 transmits the image signal through an image signal line 26 to the display panel 7. The first wireless module section 22 supplies power through the coaxial cable 37, 38 to the third antenna sections 35, 36. The first wireless module section 22 communicates the wireless communication signal with the third antenna sections 35, 36.

Accordingly, the image signal is displayed on the display screen 7a of the display panel 7. Further, the third antenna sections 35, 36 perform wireless communication based on the wireless communication signal with an external apparatus.

Figure 5:
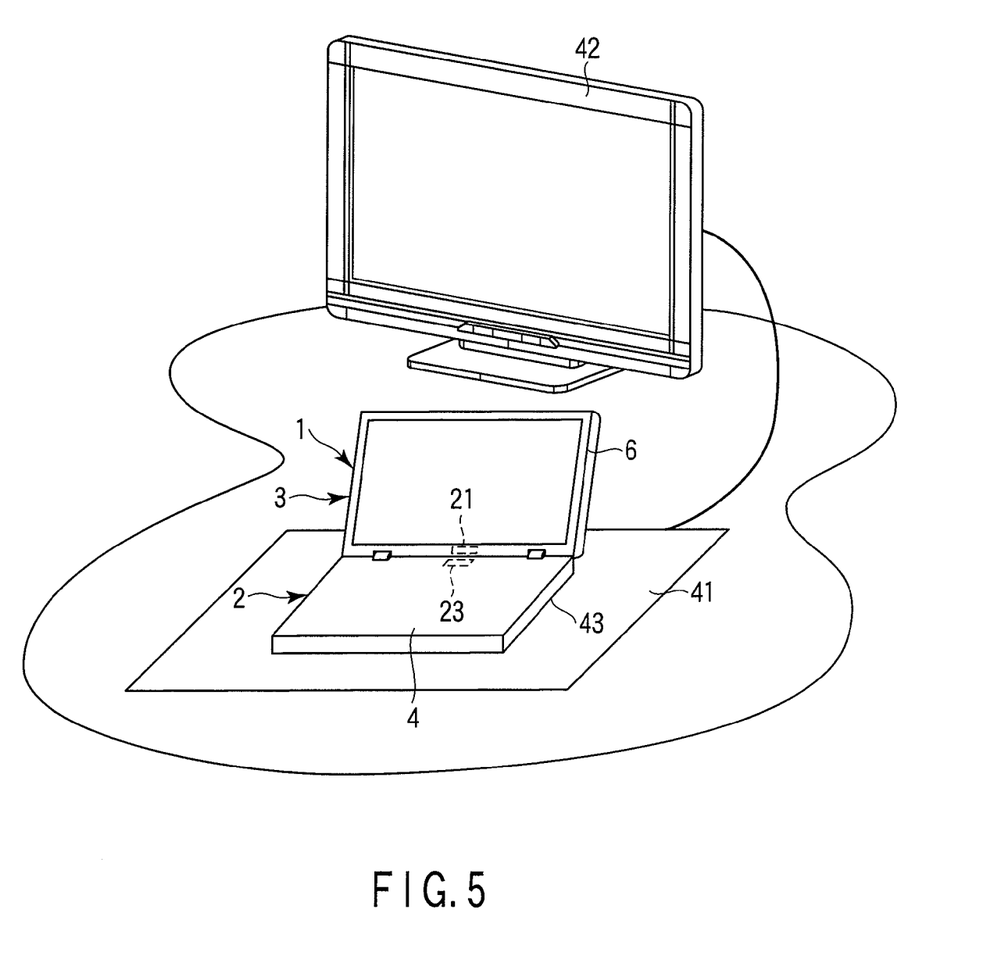
FIG. 5 is an exemplary perspective view showing an exemplary use of the portable computer shown in FIG. 1.

On the other hand, as shown in FIG. 5, the portable computer 1 may be placed on a communication adaptor in a sheet form, for example. The communication adaptor 41 is not necessarily in a sheet form, and may be a cradle or the like. The communication adaptor 41 contains an antenna (not shown) configured to perform wireless communication with the second antenna section 23. Further, the communication adaptor 41 is connected to a display device 42, such as a television, by a cable.

As shown in FIGS. 2 and 3, the main housing 4 comprising a bottom part 43 (i.e., bottom surface part 43) coming into contact with the communication adaptor 41 when the portable computer 1 is placed on the communication adaptor 41. When the main housing 4 does not have a leg part, for example, the bottom part 43 is formed of a lower surface of the main housing 4. When the main housing 4 has a leg part, for example, the bottom part 43 is formed of a lower surface of the leg part.

Distance D2 between the second antenna section 23 and the bottom part 43 of the main housing 4 (i.e., the distance from the communication adaptor 41) is within a communication distance of the second antenna section 23 (for example, with 3 cm).

As shown in FIG. 4, the main board 5 comprising a control unit 45, for example. The control unit 45 is configured to stop power supply to the first antenna section 21 and maintain power supply to the second antenna section 23 so that the second antenna section 23 communicates with the communication adaptor 41 when the display housing 6 is in the laid position relative to the main housing 4.

Figure 6:
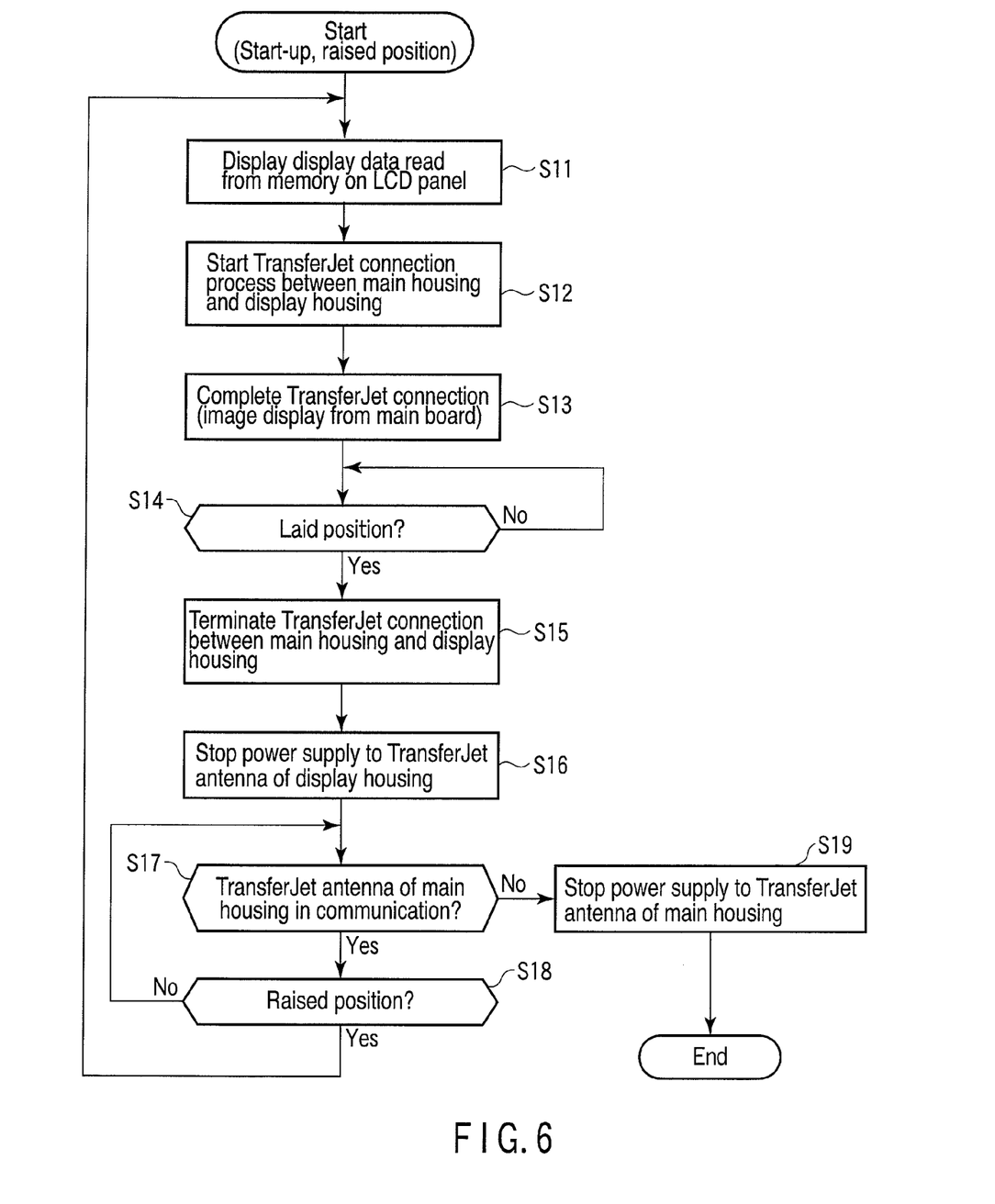
FIG. 6 is an exemplary flowchart showing a flow of processing of the portable computer shown in FIG. 1.

Referring to FIG. 6, functions of the portable computer 1 will be described. In FIG. 6, antennas for TransferJet are employed as the first and second antenna sections 21, 23, and antennas for WLAN are employed as the third antenna sections 35, 36.

When the portable computer 1 is used, the display housing 6 is first raised from the main housing 4, and a power button is operated to start up the portable computer 1. Upon start-up of the portable computer 1, display data (image data) stored in the memory 27 is read, and an image based on the display data is displayed on the display panel 7 (step S11). The image may be an image indicating that the wireless communication between the first and second antenna sections 21, 23 is being established, such as an image indicating "now connecting" or an image prompting an action of a user, such as an image indicating "input password." The type and use of the image are not particularly limited.

Around the time of the above step S11, an operation of the second antenna section 23 to recognize the first antenna section 21 is performed. If the second antenna section 23 recognizes the first antenna section 21, a connecting process for establishing wireless connection between the first and second antenna sections 21, 23 is started (step S12). If input of a password is requested in step S11, for example, the connecting process may be started after authentication is performed based on the password.

Upon completion of the process for connecting the first and second antenna sections 21, 23, the image signal is transmitted from the main board 5 to the display panel 7 via the first and second antenna sections 21, 23 (step S13). Then, the display panel 7 displays, on the display screen 7a, the image signal transmitted from the main board 5.

The control unit 45 of the portable computer 1, for example, periodically determines whether the display housing 6 is in the raised position relative to the main housing 4 (step S14). When the control unit 45 recognizes that the display housing 6 is in the laid position relative to the main housing 4, the control unit 45 terminates the connection between the first and second antenna sections 21, 23 (step S15). Further, the control unit 45 stops the power supply to the first antenna section 21 (step S16).

In the case where information communication with the communication adaptor 41 is performed, for example, the communication adaptor 41 is prepared and the portable computer 1 is placed on the communication adaptor 41. The connection between the second antenna section 23 and the communication adaptor 41 is established at an arbitrary time by, for example, a user controlling an operation button. The wireless connection between the second antenna section 23 and the communication adaptor 41 may be established when the wireless connection between the first and second antenna sections 21, 23 of the portable computer 1 is available.

As shown in FIG. 6, the control unit 45 determines whether the second antenna section 23 is connected to the communication adaptor 41 by radio after stopping the power supply to the first antenna section 21 (step S17). In the case where wireless connection between the second antenna section 23 and the communication adaptor 41 is established, the rotational position of the display housing 6 is, for example, periodically determined by the control unit 45 (step S18). If the control unit 45 recognizes that the display housing 6 is raised from the main housing 4, the connecting process for establishing wireless connection between the first and second antenna sections 21, 23 is restarted.

If wireless connection between the second antenna section 23 and the communication adaptor 41 is unavailable, the second antenna section 23 is halted (step S19).

The portable computer 1 having such a configuration makes it possible to increase the strength of the hinge sections 8a, 8b rotatably coupling the display housing 6 to the main housing 4.

For example, if many cables, such as an image signal line and a power supply line to the display panel, and coaxial cables to various antennas, extend through the hinge section, it is necessary to provide a relatively large cable insertion part in the hinge section, and it becomes difficult to ensure the strength of the hinge section. Further, a recent information processing apparatus tends to comprising increasing types of antennas in the display housing, and it has become difficult to pass the cables of all the antennas through the hinge section.

In contrast, the information processing apparatus according to the present embodiment comprising: the first antenna section 21 which is provided in the lower end part 14 of the display housing 6 coupled to the hinge sections 8a, 8b, and at least a part of which is located below the display panel 7 when the display housing 6 is in the raised position; and the second antenna section 23 which is provided in the main housing 4 and which is configured to perform wireless communication with the first antenna section 21. This configuration makes it possible to perform communication of signals (for example, image signals) between the main housing 4 and the display housing 6 by proximity wireless communication, and reduce the number of cables passing through the hinge sections 8a, 8b.

Consequently, the flexibility in the configuration of the hinge sections 8a, 8b is increased, and the strength of the hinge sections 8a, 8b can be increased. The configuration also makes it easy to deal with increase in the number of antennas provided in the display housing 6. If at least a part of the first antenna section 21 is located below the display panel 7, it becomes easier to ensure the radiation characteristic of the first antenna section 21.

Further, since proximity wireless communication, such as Trasferjet, is wireless communication within a short distance, such as 3 cm, there is extremely low possibility of interception by another apparatus and security is easily ensured.

With the configuration in which the information processing apparatus comprising the power supply line 32, 33 which is electrically connected to the power source section 29, extends from within the main housing 4 via the hinge section 8a into the display housing 6, and is configured to supply power to the display panel 7, the portable computer 1 need not have a battery, power module or the like in the display housing 6, and it becomes possible to slim the display housing 6 and reduce the weight of the portable computer 1.

With the configuration in which the portable computer 1 comprising the memory 27 provided in the display housing 6 and configured to store image data on an image to be displayed on the display panel 7 when wireless connection between the first and second antenna sections 21, 23 is unavailable, it becomes possible for a user to be aware of the situation even when the wireless connection is unavailable. Accordingly, the usability of the portable computer 1 is improved.

With the configuration in which the first and second antenna sections 21, 23 are vertically aligned with each other when the display housing 6 is in the raised position, good communication status between the first and second antenna sections 21, 23 can be easily ensured when a user opens and uses the display housing 6.

With the configuration in which the first antenna section 21 is always within 3 cm of the second antenna section 23 regardless of the rotational position of the display housing 6 relative to the main housing 4, communication between the main housing 4 and the display housing 6 can be ensured wherever a user moves the display housing 6.

With the configuration in which the main housing 4 comprising the bottom part 43 that comes into contact with the communication adaptor 41, and distance D2 between the second antenna section 23 and the bottom part 43 of the main housing 4 is within a communication distance of wireless communication, it becomes possible to perform communication with the communication adaptor 41 without providing a new antenna near the bottom part 43 of the main housing 4.

With the configuration in which power supply to the first antenna section 21 is stopped when the display housing 6 is in the laid position relative to the main housing 4, and power supply to the second antenna section 23 is maintained, it becomes possible to reduce the power requirements of the portable computer 1.

With the configuration in which the portable computer 1 comprising the third antenna sections 35, 36 which are provided in the upper end part 13 of the display housing 6 and at least a part of them is located above the display panel when the display housing 6 is in the raised position, the first antenna section 21 is electrically connected to the third antenna sections 35, 36, and a wireless communication signal used for communication of the third antenna sections 35, 36 is received from and transmitted to the second antenna section 23, the number of cables passing through the hinge sections 8a, 8b can be further reduced.

The configuration in which at least a part of the third antenna sections 35, 36 is located above the display panel 7, it becomes easier to ensure the radiation characteristic of the third antenna sections 35, 36 used, for example, for a wireless LAN.

Second Embodiment

Figure 7:
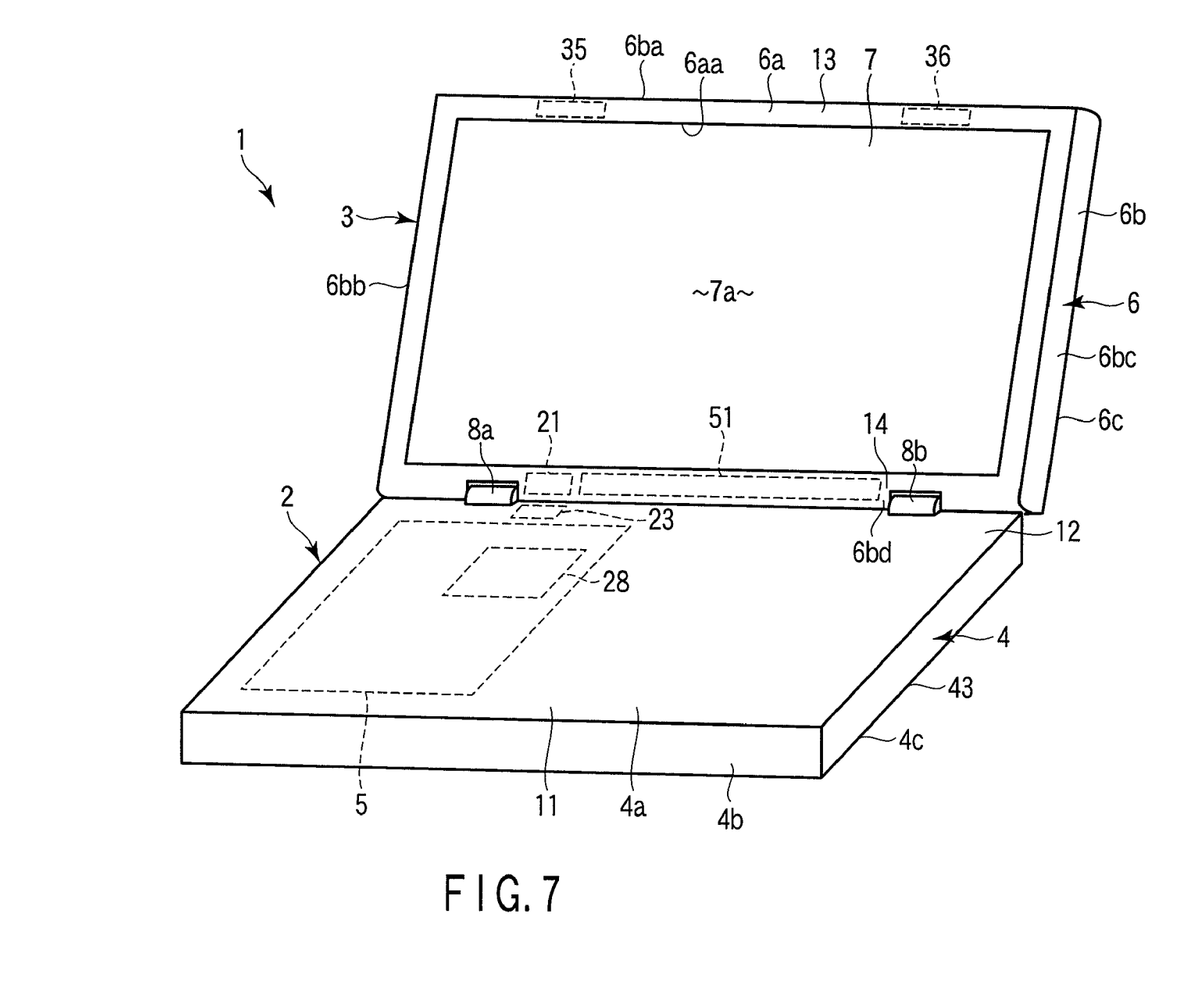
FIG. 7 is an exemplary perspective view of a portable computer according to a second embodiment of the present invention.

Next, referring to FIG. 7, a portable computer 1 as an information processing apparatus according to a second embodiment of the present invention will be described. The configurations having the same functions as or similar functions to the configurations of the above first embodiment will be assigned the same reference symbols, and the explanations thereof will be omitted. In FIG. 7, various cables are omitted for explanation.

As shown in FIG. 7, the portable computer 1 comprising an inverter 51 in the display housing 6. The inverter 51 is a circuit board for boosting current sent to the display panel 7. The inverter 51 is in a slim rectangular shape. As shown in FIG. 7, the inverter 51 is located below the display panel 7 when the display housing 6 is in the raised position relative to the main housing 4. The inverter 51 is located between a pair of hinge sections 8a, 8b, and contained in a space between the display panel 7 and the lower wall part 6bd of the peripheral wall 6b.

As shown in FIG. 7, the first antenna section 21 is located away from the inverter 51 when viewed in the thickness direction of the display housing 6 (i.e., the direction in which the display screen 7a is viewed from the front). The first antenna section 21 according to the present embodiment is provided in a region adjacent to the inverter 51. The first antenna section 21 is located between the inverter 51 and one hinge section 8a. The second antenna section 23 is located in a position corresponding to the first antenna section 21. The configurations of the portable computer 1 other than the configurations explained above are the same as the ones of the above first embodiment.

Like the portable computer according to the above first embodiment, the portable computer 1 having such configurations makes it possible to increase the strength of the hinge sections 8a, 8b that rotatably couples the display housing 6 to the main housing 4.

With the configuration in which the first antenna section 21 is located away from the inverter when viewed in the thickness direction of the display housing 6, the first antenna section 21 does not overlap the inverter 51 in the thickness direction. Consequently, it becomes possible to slim the display housing 6.

Third Embodiment

Figure 8:
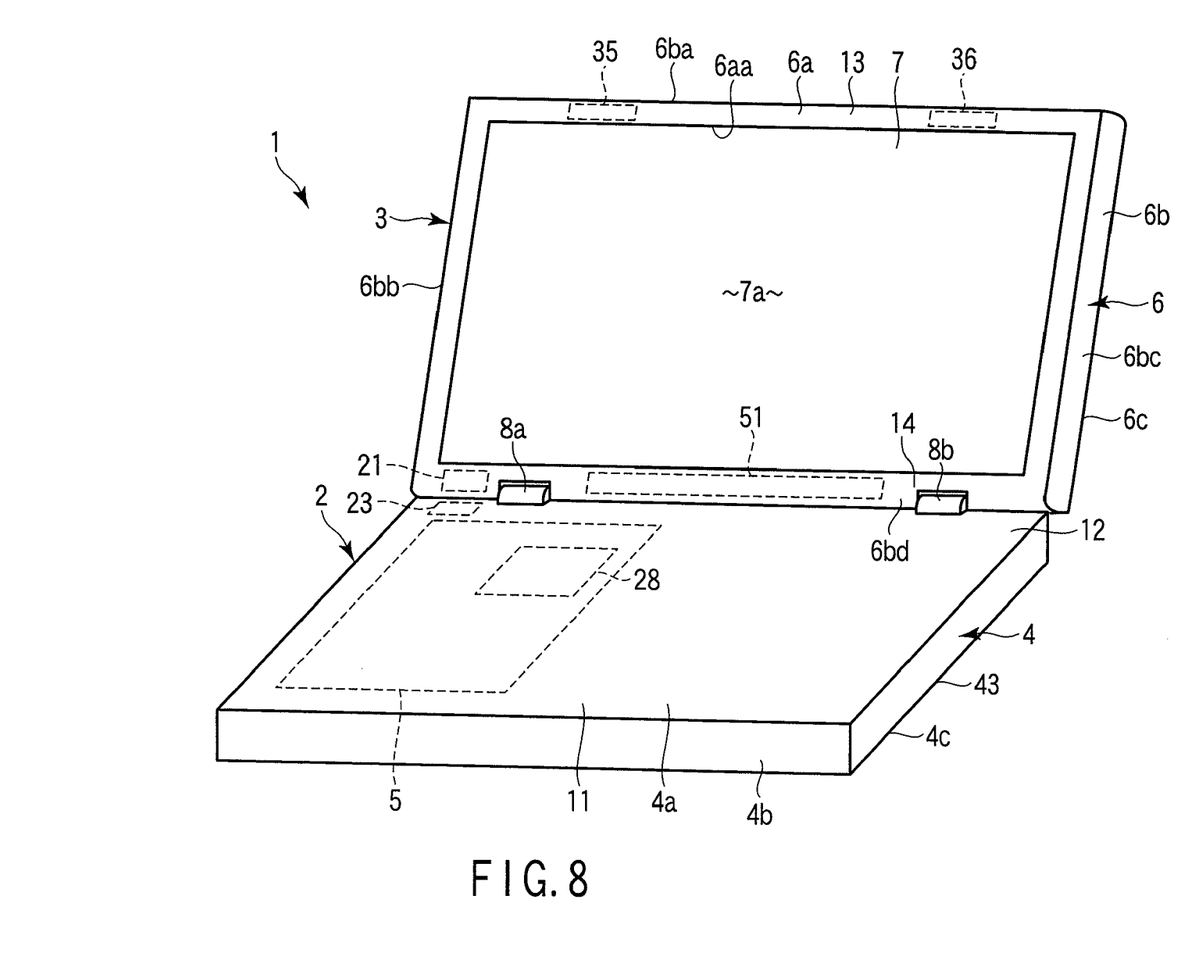
FIG. 8 is an exemplary perspective view of a portable computer according to a third embodiment of the present invention.

Next, referring to FIG. 8, a portable computer 1 as an information processing apparatus according to a third embodiment of the present invention will be described. The configurations having the same functions as or similar functions to the configurations of the above first and second embodiments will be assigned the same reference symbols, and the explanations thereof will be omitted. In FIG. 8, various cables are omitted for explanation.

As shown in FIG. 8, the first antenna section 21 is located away from the inverter 51 when viewed in the thickness direction of the display housing 6 (i.e., the direction in which the display screen 7a is viewed from the front). The hinge sections 8a, 8b are located apart from the left wall part 6bb and the right wall part 6bc of the display housing 6. The first antenna section 21 according to the present embodiment is located between the hinge sections 8a, 8b and the left wall part 6bb or the right wall part 6bc of the display housing 6. The configurations of the portable computer 1 other than the configurations explained above are the same as the ones of the above second embodiment.

The portable computer 1 having such configurations makes it possible to increase the strength of the hinge sections 8a, 8b that rotatably couple the display housing 6 to the main housing 4 like the portable computer according to the above first embodiment, and makes it possible to slim the display housing like the portable computer according to the above second embodiment. Further, with the configuration in which the first antenna section 21 is located between the hinge section 8a and the left wall part 6bb or the hinge section 8b and the right wall part 6bc of the display housing 6, it becomes possible to shorten the image signal line 26 that connects the first antenna section 21 to the display panel 7.

The portable computer 1 according to the first to third embodiments has been described above. However, the present invention is not limited to the above embodiments. The present invention may be embodied by modifying structural elements in the scope that does not go out of the subject at the stage of implementation. The information processing apparatus of the present invention may be a portable telephone or a video game machine, for example.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a main housing;
   a display housing comprising a display panel;
   a hinge between an end portion of the main housing and a first end portion of the display housing and rotatably attaching the display housing to the main housing;
   a first antenna in the first end portion of the display housing and electrically connected to the display panel, at least a portion of the first antenna being located below the display panel when the display housing is in a raised position relative to the main housing; and
   a second antenna in the main housing configured to perform wirelessly communication with the first antenna.

2. The information processing apparatus of claim 1, further comprising:
   a power source in the main housing; and
   a power supply line electrically connected to the power source and extending from the main housing through the hinge into the display housing in order to supply the display panel with power.

3. The information processing apparatus of claim 1, wherein
   the first antenna is configured to receive an image signal to be supplied to the display panel from the second antenna.

4. The information processing apparatus of claim 3, further comprising:
   a memory in the display housing configured to store image data on an image displayed on the display panel when wireless connection between the first antenna and the second antenna is unavailable.

5. The information processing apparatus of claim 1, wherein
   the first antenna and the second antenna are vertically aligned with each other when the display housing is in the raised position.

6. The information processing apparatus of claim 1, wherein
the first antenna is always within 3 cm of the second antenna.

7. The information processing apparatus of claim 1, wherein
the main housing comprising a bottom portion configured to connect with a communication adapter when the information processing apparatus is placed on the communication adapter, and
the second antenna is within a wireless communication range of the bottom portion.

8. The information processing apparatus of claim 7, wherein
the information processing apparatus is configured to stop providing power to the first antenna, and maintain power to the second antenna such that the second antenna is configured to communicate with the communication adapter when the display housing is in a laid position relative to the main housing.

9. The information processing apparatus of claim 1, further comprising:
a third antenna in a second end portion of the display housing, which is opposite to the first end part attached to the hinge, wherein
at least a portion of the third antenna located above the display panel in the state where the display housing is in the raised position,
the first antenna is electrically connected to the third antenna and configured to receive a wireless communication signal used for communication of the third antenna from the second antenna.

10. The information processing apparatus of claim 1, further comprising:
an inverter in the first end portion of the display housing attached to the hinge and located below the display panel in the state where the display housing is in the raised position, wherein
the first antenna is located away from the inverter.

* * * * *